(12) United States Patent
Kim et al.

(10) Patent No.: US 8,814,194 B2
(45) Date of Patent: Aug. 26, 2014

(54) FOLDING TYPE BICYCLE

(71) Applicant: Mando Corporation, Pyeongtaek-si (KR)

(72) Inventors: Jeong Rae Kim, Seoul (KR); Chang Bok Ko, Namyangju-Si (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 13/682,515

(22) Filed: Nov. 20, 2012

(65) Prior Publication Data

US 2014/0076649 A1 Mar. 20, 2014

(30) Foreign Application Priority Data

Sep. 19, 2012 (KR) ........................ 10-2012-0104082

(51) Int. Cl.
*B62K 15/00* (2006.01)
*B62M 6/60* (2010.01)

(52) U.S. Cl.
CPC ................ *B62K 15/008* (2013.01); *B62M 6/60* (2013.01)
USPC ....................................................... 280/278

(58) Field of Classification Search
CPC ............................ B62K 15/006; B62K 15/008
USPC .................................................. 280/278, 287
See application file for complete search history.

(56) References Cited

U.S. PATENT DOCUMENTS

| 2010/0212978 | A1* | 8/2010 | Huang ........................ 180/65.31 |
| 2012/0043148 | A1 | 2/2012 | Brady et al. |
| 2013/0277941 | A1* | 10/2013 | Ryan et al. ..................... 280/278 |

FOREIGN PATENT DOCUMENTS

| KR | 20-0196559 | | 9/2000 |
| KR | 10-2012-0027917 A | | 3/2012 |
| WO | 92/02402 A1 | | 2/1992 |
| WO | 93/21055 A1 | | 10/1993 |
| WO | WO 03055736 A1 | * | 7/2003 |
| WO | 2011/081359 A2 | | 7/2011 |
| WO | WO 2011081359 A2 | * | 7/2011 |

OTHER PUBLICATIONS

Korean Office Action issued in Korean Patent Application No. KR 10-2012-0104082 dated Nov. 27, 2013.
Extended European Search Report issued in European Patent Application No. EP 12190216.7 dated Dec. 6, 2013.

* cited by examiner

*Primary Examiner* — Kevin Hurley
(74) *Attorney, Agent, or Firm* — McDermott Will & Emery LLP

(57) ABSTRACT

A folding type bicycle is disclosed. The disclosed folding type bicycle includes a front frame provided with a front wheel and a handle, a center frame provided with pedals and a saddle, a rear frame provided with a rear wheel, a hinge device to enable the front frame, the center frame and the rear frame to pivot about one another, to be foldable with respect to one another, the hinge device comprising a front hinge member provided at the front frame, a center hinge member provided at the center frame, and a rear hinge member provided at the rear frame, a hinge shaft centrally provided at the hinge device, a front rim provided at the front hinge member, a center rim provided at the center hinge member and a rear rim provided at the rear hinge member, and rolling members to enable rolling-contact among the front, center and rear rims.

8 Claims, 9 Drawing Sheets

FOLDING TYPE BICYCLE

CROSS-REFERENCE TO RELATED APPLICATIONS

This application claims the benefit of Korean Patent Application No. P2012-104082, filed on Sep. 19, 2012 in the Korean Intellectual Property Office, the disclosure of which is incorporated herein by reference.

BACKGROUND

1. Field

Embodiments of the present invention relate to a bicycle foldable for convenient storage and transportation thereof.

2. Description of the Related Art

Bicycles, which are short-distance traveling means, are widely used for exercise or leisure.

Generally, such a bicycle includes a frame constituting a skeleton of the bicycle, and wheels, pedals and a handle, which are mounted to the frame. Basically, the bicycle is traveled by force transmitted to the wheels via a chain after being generated when the user steps the pedals to rotate a sprocket.

Conventional bicycles are inconvenient in storage and transportation because they employ an integrated frame. In order to solve such a problem, a bicycle having a foldable frame has recently been developed.

Such a bicycle is disclosed in Korean Utility Model No. 20-0341604 (registered on Feb. 2, 2004). In the disclosed bicycle, a frame, to which a front wheel and a rear wheel are rotatably mounted, is foldable in half about a portion thereof where a saddle is installed. However, this bicycle has an inconvenient and bulky folding structure.

SUMMARY

Therefore, it is an aspect of the present invention to provide a folding type bicycle having a convenient and compact folding structure.

Another aspect of the present invention is to provide a folding type bicycle capable of being stably maintained in an unfolded state.

Additional aspects of the invention will be set forth in part in the description which follows and, in part, will be obvious from the description, or may be learned by practice of the invention.

In accordance with one aspect of the present invention, a folding type bicycle includes a front frame provided with a front wheel and a handle, a center frame provided with pedals and a saddle, a rear frame provided with a rear wheel, a hinge device to enable the front frame, the center frame and the rear frame to pivot about one another, to be foldable with respect to one another, the hinge device comprising a front hinge member provided at the front frame, a center hinge member provided at the center frame, and a rear hinge member provided at the rear frame, a hinge shaft centrally provided at the hinge device, a front rim provided at the front hinge member, a center rim provided at the center hinge member and a rear rim provided at the rear hinge member, and a plurality of rolling members to enable rolling-contact among the front, center and rear rims.

Each of the front and rear rims may include rim guides each having an arc shape, and rim protrusions extending from opposite ends of each of the rim guides, respectively. Each of the rolling members may include a cylinder fitted in a fitting hole formed at the center frame, and rollers respectively fitted around opposite ends of the cylinder, to rotatably contact corresponding ones of the rim guides of the front and rear rims.

Each of the rim guides and the rim protrusions thereof may define a sector shape, to limit movement of a corresponding one of the rolling members.

The center rim may include rim guides each having an arc shape, and rim protrusions extending from opposite ends of each of the rim guides, respectively. Each of the rolling members may include a cylinder fitted in a fitting hole formed at a corresponding one of the front and rear frames, and a roller fitted around an end of the cylinder, to rotatably contact a corresponding one of the rim guides of the corresponding rim.

The hinge device may further include an operating lever to pivot about the hinge shaft, and a spacing member to adjust spacing among the front, center and rear frames in accordance with pivoting of the operating lever.

The spacing member may include a rotating cam and a fixed cam, which have facing cam surfaces, respectively. The rotating cam may be provided at the rear hinge member, to be fixed to the rear hinge member, and the fixed cam may be provided at the center hinge member, to be fixed to the center hinge member, such that spacing between the cam surfaces may be adjusted in accordance with the pivoting of the operating lever.

The folding type bicycle may further include a generator, a battery, a motor, and an electronic control unit. The generator may be operatively connected to the pedals, to generate electrical energy during stepping of the pedals. The electronic control unit and the battery may be received in one of the front, center and rear frames. The motor may be operatively connected to the rear wheel.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
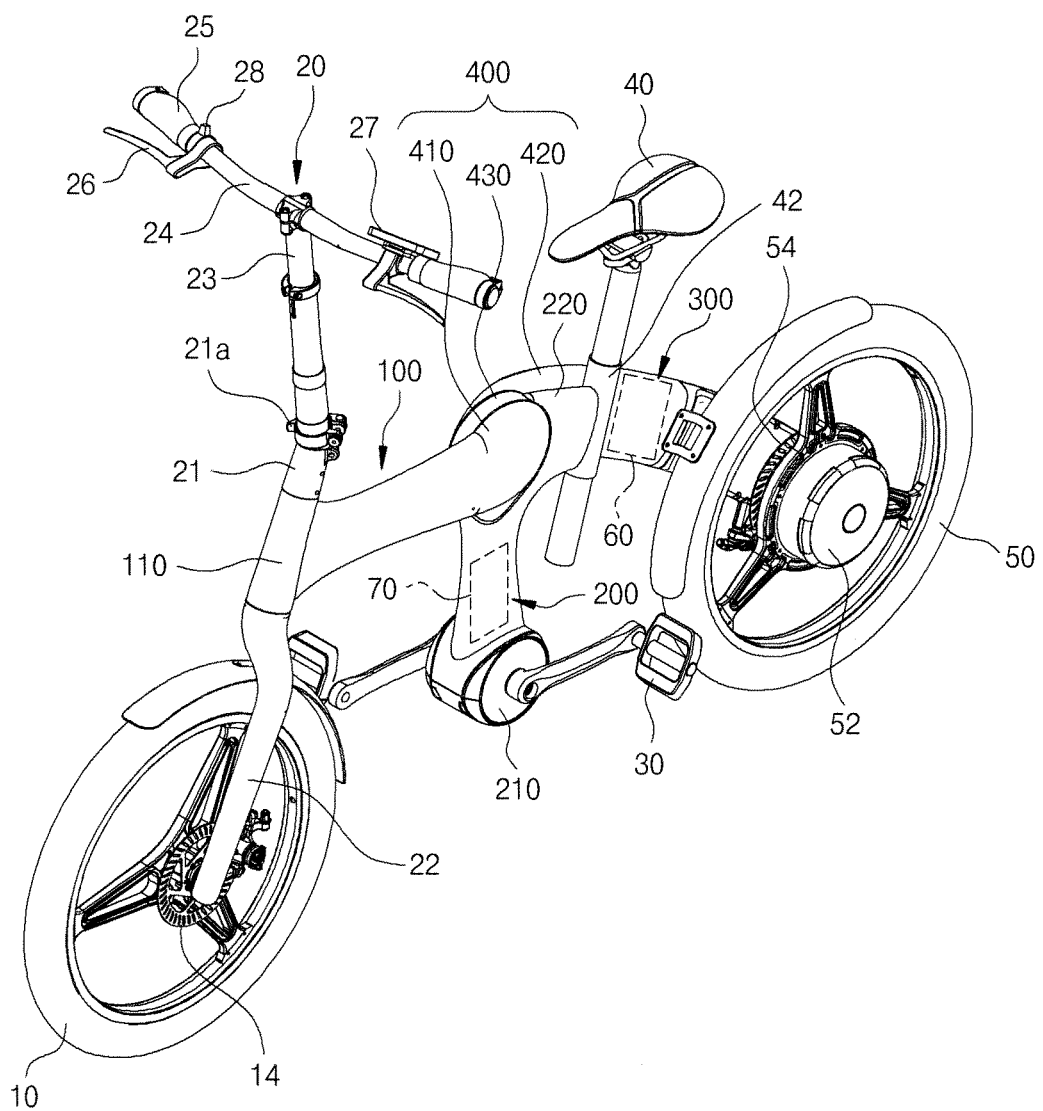
FIG. 1 is a perspective view illustrating an unfolded state of a folding type electric bicycle according to an exemplary embodiment of the present invention.

Reference will now be made in detail to the preferred embodiments of the present invention, examples of which are illustrated in the accompanying drawings. These embodiments are provided so that this disclosure will be thorough and complete, and will fully convey the spirit and scope of the present invention to those skilled in the art. Other embodiments may also be provided. Constituent elements other than elements constituting essential features of the present invention may be omitted from the drawings, for clarity of description. In the drawings, the widths, lengths, and thicknesses of constituent elements may be exaggerated for clarity and convenience of illustration. Like reference numerals refer to like elements throughout.

Figure 2:
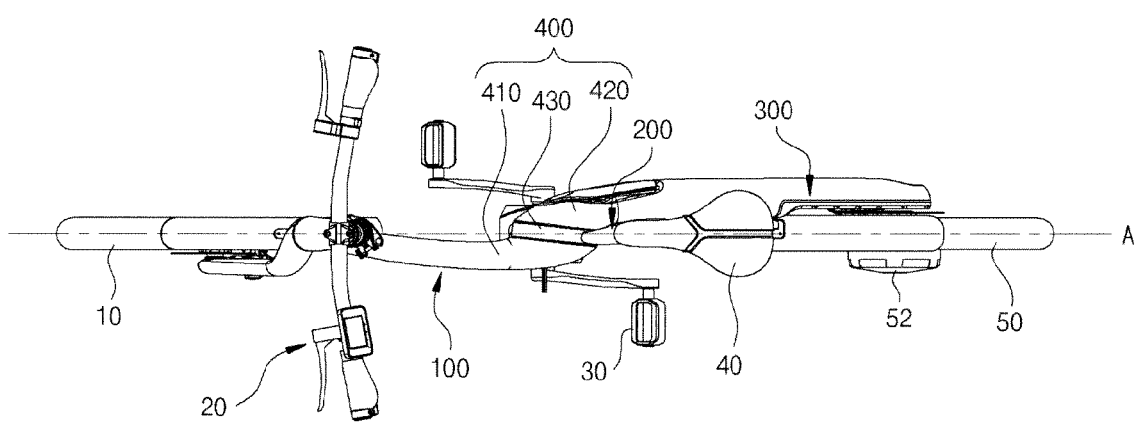
FIG. 2 is a plan view illustrating the folding type electric bicycle according to the illustrated embodiment of the present invention.
Figure 3:
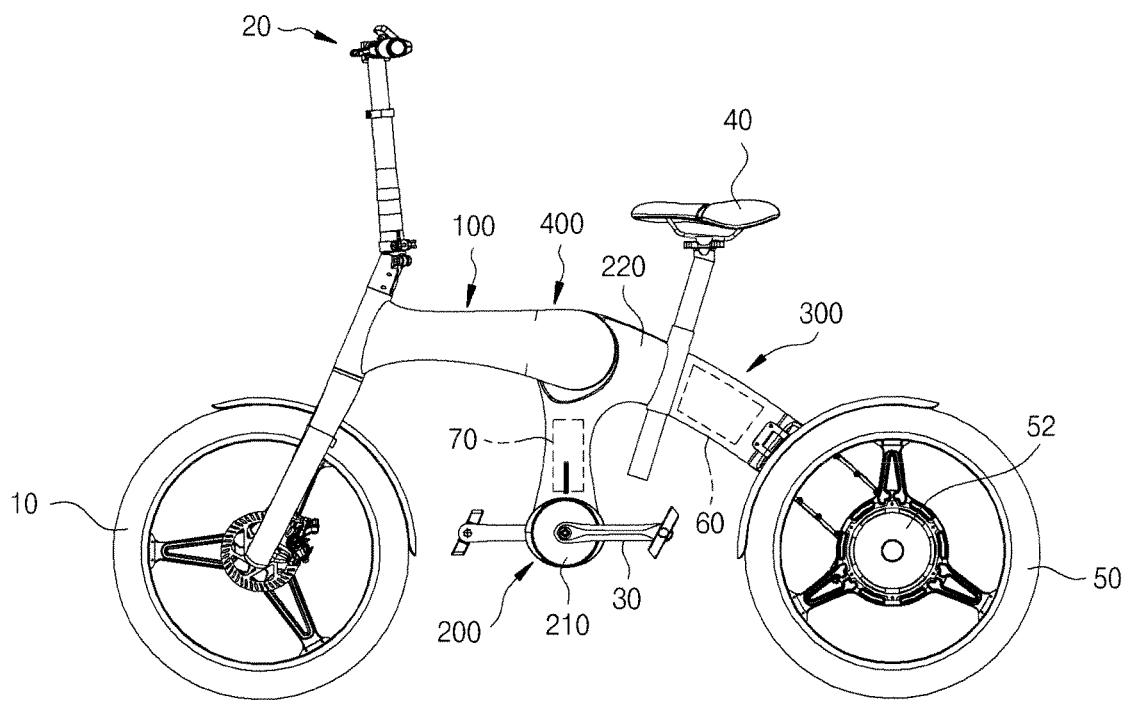
FIG. 3 is a side view illustrating the folding type electric bicycle according to the illustrated embodiment of the present invention.

FIG. 1 is a perspective view illustrating a folding type bicycle according to an exemplary embodiment of the present invention. FIG. 2 is a plan view corresponding to FIG. 1. FIG. 3 is a side view corresponding to FIG. 1.

Referring to FIGS. 1 to 3, the folding type bicycle according to the illustrated embodiment of the present invention includes a front frame 100 provided with a front wheel 10 and a handle 20, a center frame 200 provided with pedals 30 and a saddle 40, and a rear frame 300 provided with a rear wheel 50. The frames 100, 200 and 300 are pivotally coupled to one another by a hinge device 400.

The front frame 100 has a hollow bar structure having an inner space. The front frame 100 is provided, at one end thereof, with a handle tube 110 while being, provided, at the other end thereof, with a front hinge member 410, to be pivotally coupled to the center frame 200.

A handle stem 21 is rotatably fitted in the handle tube 110, which is a hollow structure. The handle stem 21 is provided, at a lower end thereof, with a front wheel mounting frame 22 extending downwardly from a lower end of the handle tube 110. The handle stem 21 is also provided, at an upper end thereof, with a handle mounting frame 23 extending upwardly from an upper end of the handle tube 110.

The front wheel mounting frame 22 is laterally bent from a center of the handle stem 21, to cause the front wheel 10 to be aligned with the rear wheel 50 along a line A (FIG. 2). The handle mounting frame 23 supports a central portion of the handle bar 24. For steering convenience of the user, respective handle grips 25 and respective brake levers 26 for braking of the front wheel 10 and rear wheel 50 are provided at opposite ends of the handle bar 24.

A display device 27 is detachably mounted at one side of the handle bar 24, to display information as to a speed change state and a battery amount in the case in which the bicycle is an electric bicycle. At the other side of the handle bar 24, a lever 28 for acceleration and speed change is installed.

The center frame 200 has a hollow bar structure having an inner space. The center frame 200 is provided, at one end thereof, with a pair of pedals 30 while being, provided, at the other end thereof, with a center hinge member 430 to pivotally couple the front frame 100 and rear frame 300 to the center frame 200 at opposite sides of the center frame 200, respectively. The pedals 30 are rotatable about a pedal coupler 210 provided at the center frame 200.

A generator (not shown) is installed within the pedal coupler 202, to convert rotational force of the pedal 30 into electrical energy. The electrical energy is charged in a battery 60, which is electrically connected to the generator. An electrical control unit (ECU) 70 is installed within the center frame 200, for electrical connection and control of the whole electrical elements including the generator and battery 60. Since each of the frames 100, 200 and 300 has an inner space, the ECU 70 may be installed in one frame other than the center frame 200, namely, the frame 100 or 300.

The center frame 200 includes a saddle frame 220 for installation of the saddle 40.

The saddle frame 220 is provided, at a rear side thereof, with a saddle tube 42 for installation of the saddle 40. A saddle rod 52 is coupled to the saddle tube 42 in order to adjust the level of the saddle 40. The saddle frame 220 may be integrated with the center frame 200. Alternatively, the saddle frame 220 may be separate from the center frame 200. In the latter case, the saddle frame 220 and center frame 200 may be assembled through welding or bolting.

The rear frame 300 has a hollow bar structure having an inner space. At one end of the rear frame 300, the rear wheel 50 is rotatably installed. The rear frame 300 is also provided, at the other end thereof, with a rear hinge member 420, to be pivotally coupled to the center frame 200.

The battery 60 is installed within the inner space of the rear frame 300, in which a battery management system (not shown), etc. are also installed. These elements are electrically connected to the ECU 70 provided at the center frame 200. The rear wheel 50 is provided with a motor 52, which receives power from the battery 60, thereby rotating the rear wheel 50. Since each of the frames 100, 200 and 300 has an inner space, as described above, the battery 60 may be installed in one frame other than the rear frame 300, namely, the frame 100 or 200.

Although no detailed description has been given of the front wheel 10 and rear frame 50, the wheels 10 and 50 are provided with braking members, namely, discs 14 and 54 and frictional pads, respectively, to restrict rotational force during operation of the brake levers 26.

Figure 4:
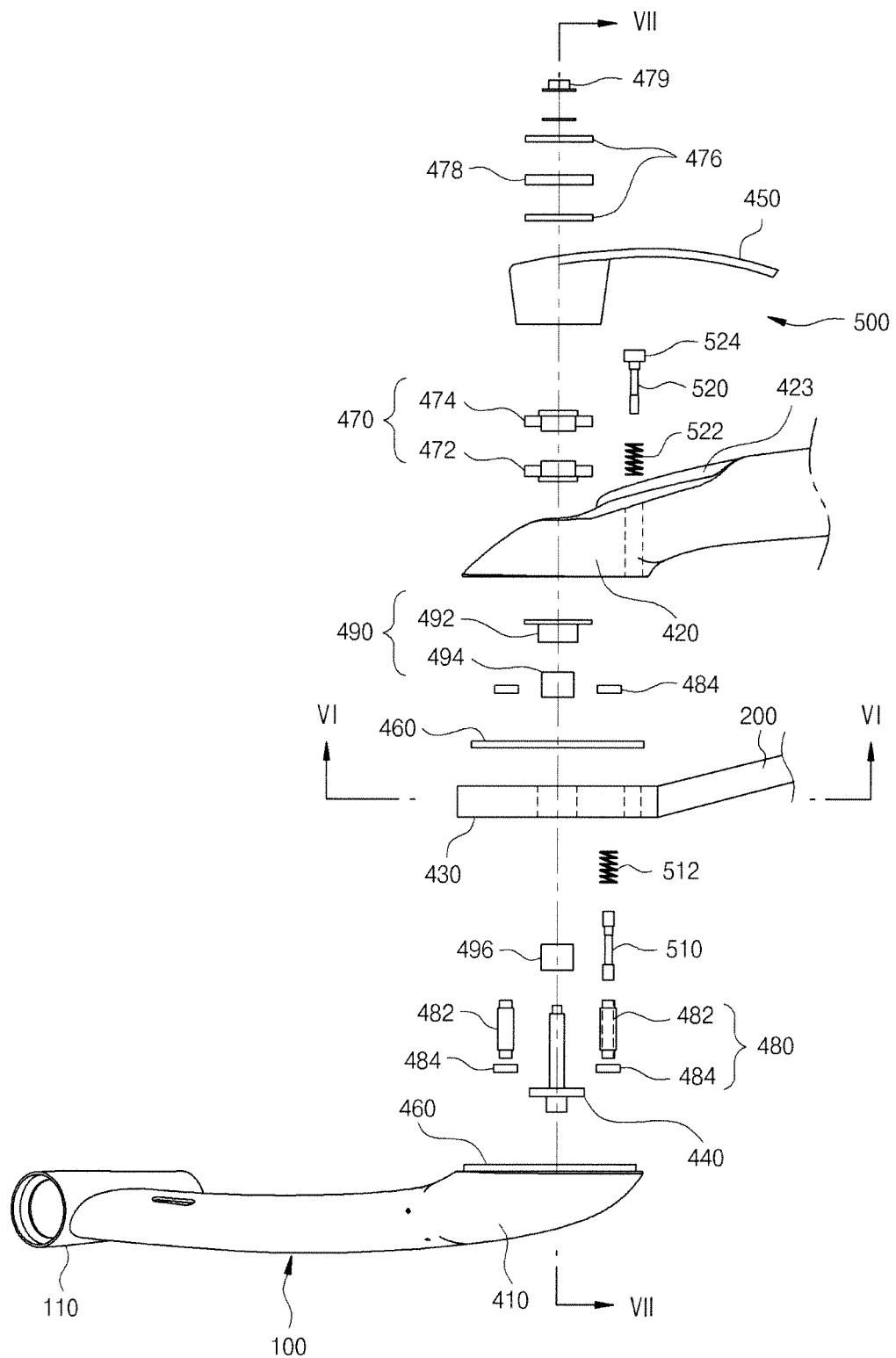
FIG. 4 is an exploded plan view illustrating a hinge device of the folding type electric bicycle according to the illustrated embodiment of the present invention.
Figure 5:
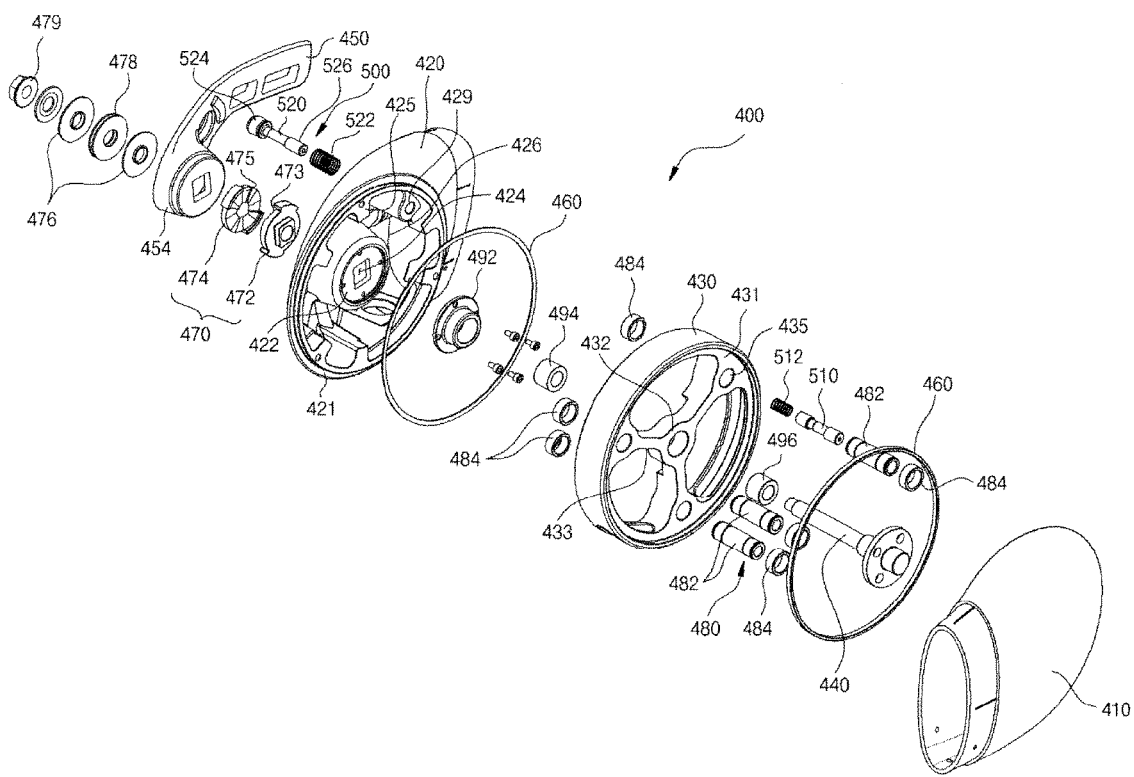
FIG. 5 is an exploded perspective view illustrating the hinge device of the folding type electric bicycle according to the illustrated embodiment of the present invention.

FIGS. 4 and 5 are views for concretely explaining the hinge device 400 to pivotally couple the front frame 100, center frame 200 and rear frame 300.

Referring to FIGS. 4 and 5, the hinge device 400 includes the front hinge member 410, which is provided at the other end of the front frame 100, the rear hinge member 420, which is provided at the other end of the rear frame 300, and the center hinge member 430, which is provided at the other end of the center frame 200. The front hinge member 410 and rear hinge member 420 are coupled to left and right surfaces of the center hinge member 430, respectively.

Figure 9:
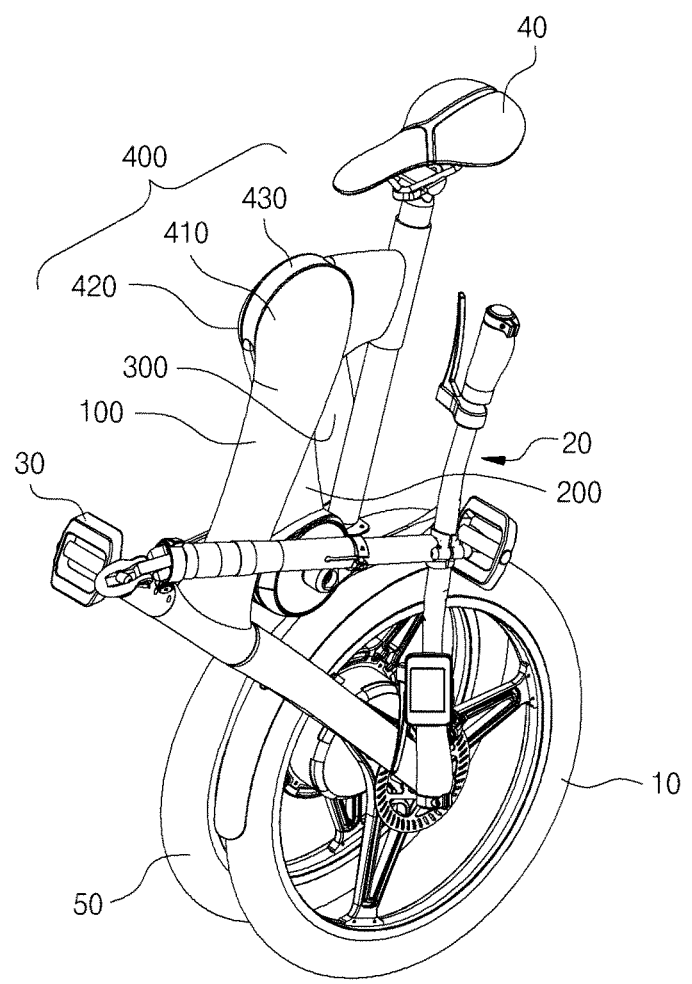
FIG. 9 is a perspective view illustrating a folded state of the folding type electric bicycle according to the illustrated embodiment of the present invention.

Each of the hinge members 410, 420 and 430 forms an inclination angle of 6° with respect to the line A, along which the front wheel 10 and rear wheel 50 are aligned. In accordance with the inclination angle, the front wheel 10 and rear wheel 50 are aligned in an unfolded state of the bicycle (FIG. 1), and the front wheel 10 and rear wheel 50 are arranged in parallel in a folded state of the bicycle (FIG. 9).

A hinge shaft 440 is centrally arranged within the hinge members 410, 420 and 430. The hinge shaft 440 is fixedly mounted, at one end thereof, to the front hinge member 410 by a mount. An intermediate portion of the hinge shaft 440 extends through a center hub 432 centrally provided at the center hinge member 430. The other end of the rear hinge member 420 is coupled to an operating lever 450 while extending through the rear hinge member 420.

The center hinge member 430 includes a center rim 431 provided at a periphery of the center hinge member 430 for lightness of the center hinge member 430, and a center hub 432 centrally provided at the center hinge member 430. The center rim 431 and center hub 432 are connected by a plurality of ribs 433. The hinge shaft 440 extends through a hole formed in the center hub 432.

Similarly to the center hinge member 430, the front hinge member 410 includes a front rim and a front hub, and the rear hinge member 420 includes a rear rim 421 and a rear hub 422. Although the front rim and front hub are not shown, they have the same shapes as those of the rear rim 421 and rear hub 422.

The operating lever 450 is provided at the rear hinge member 420 of the rear frame 300, to pivot about the hinge shaft 440. A lever cover 454 is provided at the operating lever 450, to cover the other end of the hinge shaft 440.

Meanwhile, the hinge device 400 also includes metal rings 460 respectively provided between facing rotational contact surfaces of the hinge members 410 and 430 and between facing rotational contact surfaces of the hinge members 420 and 430, to achieve smooth pivoting of the hinge members 410, 420 and 430. The hinge device 400 further includes a spacing member 470 to adjust the spacing among the hinge members 410, 420 and 430, and rolling members 480 to achieve smooth pivoting of the hinge members 410, 420 and 430.

The spacing member 470 includes a fixed cam 472 and a rotating cam 474 provided between the rear hinge member 420 and the operating lever 450.

The fixed cam 472 is fitted, at a rear surface thereof, in a square fitting hole provided at the rear hub 422 of the rear hinge member 420, to be fixed to the rear hinge member 420. The rotating cam 474 is fitted, at a rear surface thereof, in a square fitting hole provided at the operating lever 450, to be fixed to the operating lever 450.

Cam surfaces 473 and 475 are provided at facing front surfaces of the fixed cam 472 and rotating cam 474, respectively. Each of the cam surfaces 473 and 475 has a structure having mountains and valleys. Accordingly, when the operating lever 450 is positioned at a locking position, the cam surfaces 473 and 475 are in contact with each other between the mountains thereof, so that they are spaced apart from each other by 2 mm. On the other hand, when the operating lever 450 is positioned at an unlocking position, the cam surfaces 473 and 475 are in contact with each other between the mountains thereof and the valleys thereof, so that they close contact without spacing therebetween. The hinge shaft 440 extends through the fixed cam 472 and rotating cam 474 such that it does not interfere with the operations of the cam surfaces 473 and 475 of the fixed cam 472 and rotating cam 474. A nut 479 is fastened to the other end of the hinge shaft 440 extending through the operating lever 450 via washers 476 and a needle bearing 478.

Each rolling member 480 includes a cylinder 482 fitted in a fitting hole 435 of the center frame 200, and rollers 484 respectively fitted around opposite ends of the cylinder 482.

The rollers 484 rotatably contact rim guides 425 provided at a front rim of the front hinge member 410 and a rear rim 421 of the rear hinge member 420, respectively, for rolling-contact of the front and rear hinge members 410 and 420 with the center hinge member 430.

Figure 6:
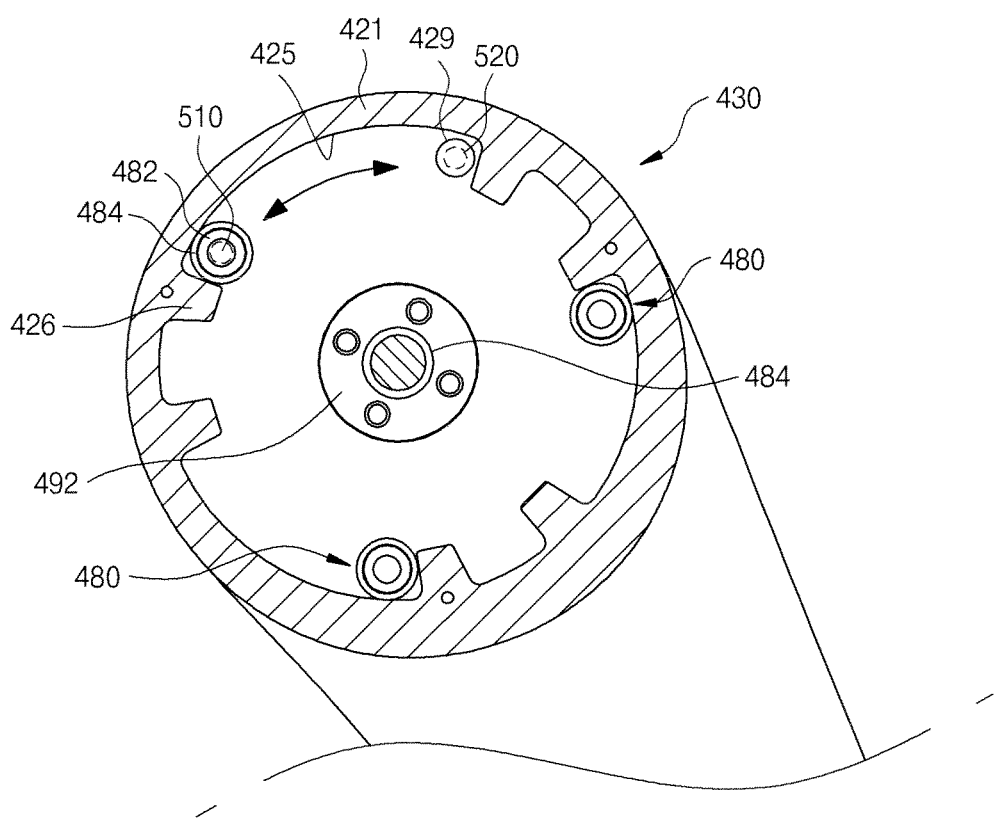
FIG. 6 is a cross-sectional view taken along the line VI-VI in FIG. 4, to illustrate the hinge device.

Each rim guide 425 includes a plurality of rim protrusions 426 to support rolling of the corresponding rollers 484 while limiting the lateral movement distance of the corresponding rollers 484. That is, as shown in FIG. 6, a sector-shaped structure is formed by each rim guide 425, which has an arc shape, and a pair of rim protrusions 426 protruded from opposite ends of the rim guide 425. Within the sector-shaped structure, one roller 484 rolls between the opposite ends of the rim guide 425. Thus, the pivotal movement distance of the frames 100 and 300 is effectively limited.

The hinge device 400 further includes a load-distributing support unit 490 to reduce a load repeatedly applied to the hinge shaft 450 by the weights of the frames 100 and 300 during folding and unfolding operations.

The load-distributing support unit 490 includes a ring mount 492 fitted around the hinge shaft 440 between the center frame 200 and the rear frame 300, and a bearing 494 fitted in the ring mount 492, to be interposed between the hinge shaft 440 and the ring mount 492. The ring mount 492 is fixed to the rear hub 422 of the rear hinge member 420. The bearing 494, which is fitted in the ring mount 492, effectively distributes the load applied to the hinge shaft 440, at two points spaced apart from each other, together with a bearing 496 fitted in the center hub 432.

The reason why the load-distributing support unit 490 is installed between the center frame 200 and the rear frame 300 in this embodiment is because the spacing member 470 and hinge shaft mount are installed at portions of the hinge shaft 440 spaced apart from the center hub 432, respectively. When the position of the spacing member 470 or hinge shaft mount is changed, the position of the load-distributing support 490 may be appropriately changed by those skilled in the art.

The hinge device 400 further includes a locking pin member 500 extending through the hinge members 410, 420 and 430 in order to stably maintain the front frame 100, center frame 200 and rear frame 300 in an unfolded state.

The locking pin member 500 includes a center pin 510 provided at the center frame 200 and a rear pin 520 provided at the rear frame 300.

The center pin 510 is disposed in one of the fitting holes 435 provided at the center rim 431 of the hinge member 430. In detail, the center pin 510 is fitted in the hole of the cylinder 482 fitted in the fitting hole 435, in which the center pin 510 is disposed. An elastic member 512 is also installed in the cylinder 482. The center pin 510 is normally disposed within the center hinge member 430 by the elastic member 512. Upon receiving external force, the center pin 510 is protruded toward the front hinge member 410.

The rear pin 520 is fitted in a fitting hole 429 provided at the rear rim 421 of the rear hinge member 420. An elastic member 522 is also installed in the fitting hole 429. In detail, the rear pin 520 is disposed such that a head 524 thereof is outwardly protruded from the rear hinge member 420 by the elastic member 522. When external force is applied to the rear pin 520, the head 524 is inserted into the rear hinge member 420, and a tail 526 of the rear pin 520 opposite to the head 524 is protruded toward the center hinge member 430.

Figure 7:
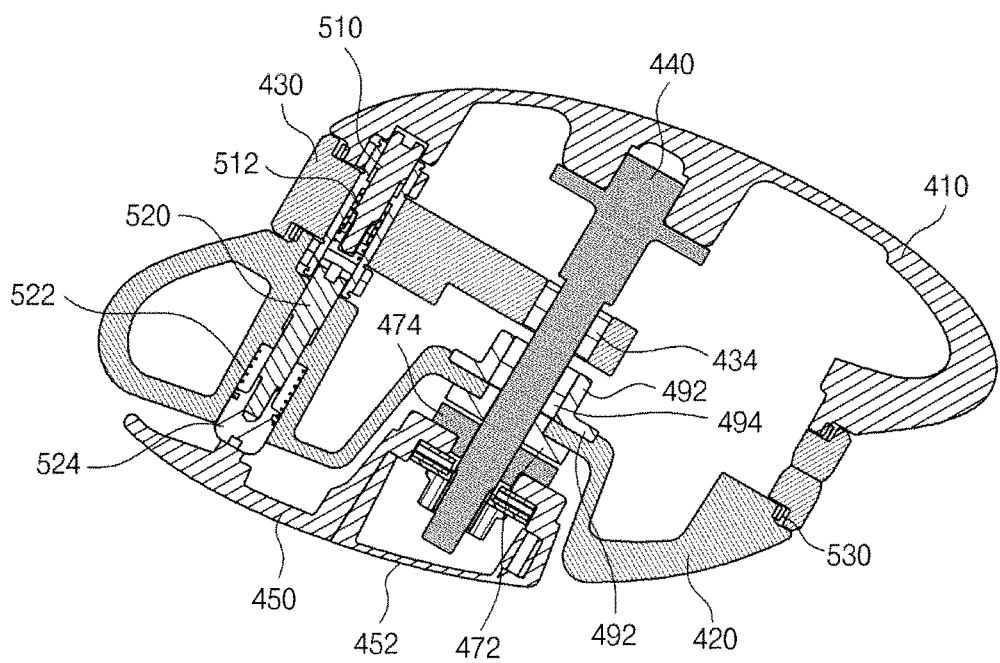
FIG. 7 is a cross-sectional view taken along the line VII-VII in FIG. 4, to illustrate the hinge device.

The center pin 510 and rear pin 520 are aligned in the unfolded state of the bicycle, as shown in FIG. 7. On the other hand, the center pin 510 and rear pin 520 are spaced apart from each other in the folded state of the bicycle, as shown in FIG. 6.

Hereinafter, operation of the electric bicycle having the above-described configuration according to the illustrated embodiment will be described. Although the electric bicycle as described above is illustrated in this embodiment, embodiments of the present invention may be easily implemented in general folding type bicycles by those skilled in the art, through modifications and changes, without being limited to the electric bicycle.

As shown in FIGS. 1 to 3, in the folding type bicycle according to the illustrated embodiment of the present invention, the front wheel 10 and rear wheel 50 are aligned along the line A in a completely unfolded state of the bicycle.

Figure 8:
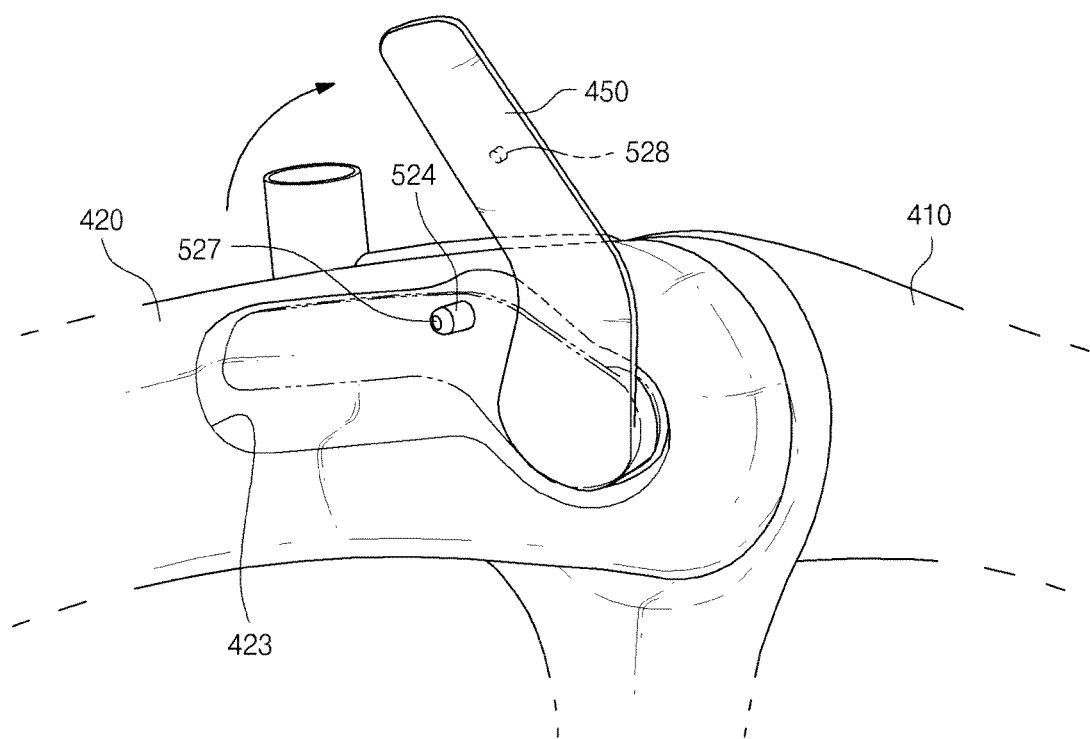
FIG. 8 is a schematic view illustrating an operating lever of the folding type electric bicycle according to the illustrated embodiment of the present invention.

FIG. 8 is a view for explaining operation of the operating lever 450. In the unfolded state of the bicycle, the operating lever 450 is received in a seating groove 423 provided at the rear hinge member 420, as indicated by a dotted line in FIG. 8. On the other hand, in the folded state of the bicycle, the operating lever 450 is separated from the seating groove 423 of the rear hinge member 420, as indicated by a solid line in FIG. 8.

In order to couple the operating lever 450 and locking pin member 500 at a correct position within the seating groove 423, the head 524 of the rear pin 520 is provided with an engagement groove 527, and the operating lever 450 is provided with an engagement lug 528 corresponding to the engagement groove 527.

Upon folding the bicycle, the user pivots the operating lever 450 about the hinge shaft 440. When the operating lever 450 is separated from the seating groove 423 of the rear frame 330, the rear pin 520 of the locking pin member 500 is retracted by the elastic member 522 such that the head 524 is exposed. Since the rear pin 520 pushes the center pin 510 in the aligned state, the center pin 510 is elastically retracted toward the operating lever 450 by the elastic member 512 when the rear pin 520 is retracted.

In accordance with the retraction of the rear pin 520, the tail 526 of the rear pin 520 is inserted into the fitting hole 429. As a result, locking between the rear hinge member 420 and the center hinge member 430 is released. Similarly, the center pin 510 is inserted into the cylinder 482 thereof in accordance with the retraction thereof. As a result, locking between the center hinge member 430 and the front hinge member 410 is released.

When locking of the locking pin member 500 is released as described above, the user can fold the bicycle to the state of FIG. 9 by pivoting the front frame 100 and rear frame 330 about the hinge device 400 at the left and right sides of the center frame 200, respectively. In this case, the handle stem 21 is folded toward the front wheel 10 after release of a clamp 21a. In the folded state, the user may easily move the bicycle to a desired location after grasping the saddle 40.

Meanwhile, although the operating lever 450 is illustrated in this embodiment as being provided at the rear frame 300, embodiments of the present invention are not limited thereto. For example, the operating lever 450 may be provided at the front frame 100.

Also, although, in the illustrated embodiment, the rollers 484 of each rolling member 480 are provided at the center frame 200, and the rim guides 425 to support rolling of the rollers 484 are provided at the front frame 100 and rear frame 300, respectively, embodiments of the present invention are not limited thereto. For example, the positions of these elements may be reversed. That is, the cylinder and rollers 484 of each rolling member 480 may be provided at each of the front frame 100 and rear frame 300, and a rim guide 425 to support the rollers 484 may be provided at the center frame 200.

As apparent from the above description, the folding type bicycle according to the illustrated embodiment of the present invention may achieve a compact folding size because the front frame and rear frame are folded about the center frame such that the bicycle is folded in triple.

In the folding type bicycle according to the illustrated embodiment of the present invention, it may also be possible to stably and firmly maintain the unfolded state of the bicycle because the locking pin member extending through the front frame, center frame and rear frame is movable between a locking position and an unlocking position, only through operation of the operating lever.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A folding type bicycle comprising:
   a front frame provided with a front wheel and a handle;
   a center frame provided with pedals and a saddle;
   a rear frame provided with a rear wheel;
   a hinge device to enable the front frame, the center frame and the rear frame to pivot about one another, to be foldable with respect to one another, the hinge device comprising a front hinge member provided at the front frame, a center hinge member provided at the center frame, and a rear hinge member provided at the rear frame;
   a hinge shaft centrally provided at the hinge device;
   a front rim provided at the front hinge member, a center rim provided at the center hinge member and a rear rim provided at the rear hinge member; and
   a plurality of rolling members fitted in fitting holes in the center hinge member to enable rolling-contact among the front, center and rear rims.

2. The folding type bicycle according to claim 1, wherein:
   each of the front and rear rims comprises rim guides each having an arc shape, and rim protrusions extending from opposite ends of each of the rim guides, respectively; and
   each of the rolling members comprises a cylinder fitted in a fitting hole formed at the center frame, and rollers respectively fitted around opposite ends of the cylinder, to rotatably contact corresponding ones of the rim guides of the front and rear rims.

3. The folding type bicycle according to claim 2, wherein each of the rim guides and the rim protrusions thereof define a sector shape, to limit movement of a corresponding one of the rolling members.

4. The folding type bicycle according to claim 1, wherein:
   the center rim comprises rim guides each having an arc shape, and rim protrusions extending from opposite ends of each of the rim guides, respectively; and
   each of the rolling members comprises a cylinder fitted in a fitting hole formed at a corresponding one of the front and rear frames, and a roller fitted around an end of the cylinder, to rotatably contact a corresponding one of the rim guides of the corresponding rim.

5. The folding type bicycle according to claim 4, wherein each of the rim guides and the rim protrusions thereof define a sector shape, to limit movement of a corresponding one of the rolling members.

6. The folding type bicycle according to claim 1, wherein the hinge device further comprises:
   an operating lever to pivot about the hinge shaft; and
   a spacing member to adjust spacing among the front, center and rear frames in accordance with pivoting of the operating lever.

7. The folding type bicycle according to claim 6, wherein:
   the spacing member comprises a rotating cam and a fixed cam, which have facing cam surfaces, respectively; and
   the rotating cam is provided at the rear hinge member, to be fixed to the rear hinge member, and the fixed cam is provided at the center hinge member, to be fixed to the center hinge member, such that spacing between the cam surfaces is adjusted in accordance with the pivoting of the operating lever.

8. The folding type bicycle according to claim 7, further comprising:
   a battery, a motor, and an electronic control unit,
   wherein the electronic control unit and the battery are received in one of the front, center and rear frames, and the motor is operatively connected to the rear wheel.

* * * * *